INFORMATION HANDLING APPARATUS
Filed June 3, 1959
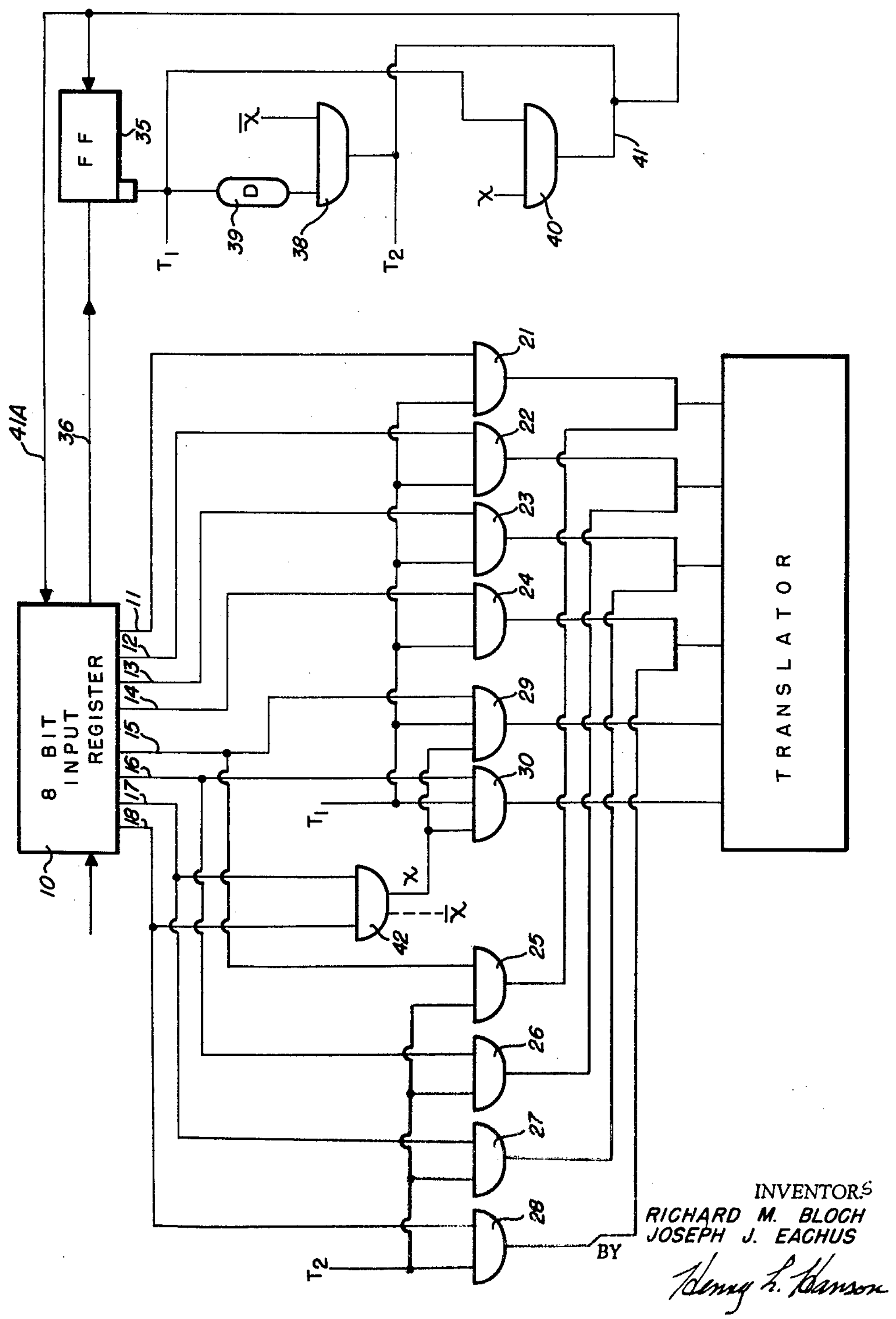
INVENTORS
RICHARD M. BLOCH
JOSEPH J. EACHUS
BY
Henry L. Hanson
ATTORNEY United States Patent Office 3,008,127

Patented Nov. 7, 1961

3,008,127
INFORMATION HANDLING APPARATUS

Richard M. Bloch, West Newton, and Joseph J. Eachus, Cambridge, Mass., assignors to Minneapolis-Honeywell Regulator Company, Minneapolis, Minn., a corporation of Delaware Filed June 3, 1959, Ser. No. 817,907
6 Claims. (Cl. 340—172.5)

A general object of the present invention is to provide a new and improved apparatus for manipulating digital data. More specifically, the present invention is concerned with a new and improved apparatus which permits the random intermixing of the numeric and alpha-numeric information in a single data processing word.

In data processing apparatus, it is common practice to represent the data processed by a plurality of binary digits or bits arranged in a predetermined pattern to define numeric characters or alpha-numeric characters. Generally, when binary coded decimal numbers are being manipulated, the bits may be considered in combinations of four for each number. When alpha-numeric data is being manipulated, the bits may be considered in the combinations of six bits for each character.

Heretofore, when one or more words, each having several characters, is being considered within a data processor, the programmer or operator of the processor knows, by prearrangement, each bit position in a word or combination of words and thereby knows just what type data is located in each word. When certain types of data are manipulated, for example, an item stock number, numbers and characters within the stock number may be intermixed in a random manner. This has generally required that the data within the word all be considered in six-bit combinations, or else located only in restricted locations in the word, sometimes referred to as fields. It will be readily apparent that if a large number of stock numbers are being handled, more word space will be required for representing the numbers.

In accordance with the principles of the present invention, a new and improved data processing apparatus has been provided wherein numeric and alpha-numeric data may be intermixed by prearrangement or by the data processor, and the associated utilizing apparatus is capable of automatically distinguishing whether or not selective groups of information should be considered in four-bit combinations or in six-bit combinations. This has been achieved by a scheme which permits the use of special designators carried with the information where the designators may be automatically utilized as information whenever the data is interpreted in terms of four-bit combinations. This provides a ready means for compressing the data into a minimum number of bit locations without jeopardizing the informational content of the bit groupings or words.

It is accordingly a further object of the present invention to provide a new and improved information handling apparatus which is capable of manipulating intermixed numeric and alpha-numeric information wherein the designators for the numeric information and alpha-numeric information are interpreted as numeric information when all of the bits of the combination are treated as numeric information.

In the preferred embodiment of the invention, the data was arranged to be manipulated in eight-bit combinations wherein the eight bits could be used to represent two numeric characters of four bits each, or one alpha-numeric character of six-bit length. By appropriately relating the two high-order bits of the eight-bit combination, it is possible to separate the bits in the desired manner.

It is therefore a still further object of the present invention to provide a new and improved data processing apparatus for manipulating data in a bit combination where the bits may be interpreted as two separate four-bit numeric characters, or as a single alpha-numeric character.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

Referring to the single figure, there is illustrated here an apparatus for interpreting eight bits of input data and transferring to the output of the circuit two combinations of four bits each or a single six-bit combination for further manipulation.

In order to understand the manner in which the circuit operates, a representative code for the data should be considered. Tabulated below is a code which is useful in the described circuit. It will be seen that the code represented below is an eight-bit code, and that whenever the two high-order bits of the code are both "ones," the six low-order bits are interpreted in terms of an alpha-numeric character. Whenever the two high-order bits are not both "ones," the eight-bit combination is then treated as two separate numeric characters.

*Code translation table*

| Code | Rep. | Code | Rep. |
|---|---|---|---|
| 00000000 | 00 | 01000000 | 40 |
| 00000001 | 01 | 01000001 | 41 |
| 00000010 | 02 | 01000010 | 42 |
| 00000011 | 03 | 01000011 | 43 |
| 00000100 | 04 | 01000100 | 44 |
| 00000101 | 05 | 01000101 | 45 |
| 00000110 | 06 | 01000110 | 46 |
| 00000111 | 07 | 01000111 | 47 |
| 00001000 | 08 | 01001000 | 48 |
| 00001001 | 09 | 01001001 | 49 |
| 00001010 | 0− | 01001010 | 4− |
| 00001011 | 0+ | 01001011 | 4+ |
| 00010000 | 10 | 01010000 | 50 |
| 00010001 | 11 | 01010001 | 51 |
| 00010010 | 12 | 01010010 | 52 |
| 00010011 | 13 | 01010011 | 53 |
| 00010100 | 14 | 01010100 | 54 |
| 00010101 | 15 | 01010101 | 55 |
| 00010110 | 16 | 01010110 | 56 |
| 00010111 | 17 | 01010111 | 57 |
| 00011000 | 18 | 01011000 | 58 |
| 00011001 | 19 | 01011001 | 59 |
| 00011010 | 1− | 01011010 | 5− |
| 00011011 | 1+ | 01011011 | 5+ |
| 00100000 | 20 | 01100000 | 60 |
| 00100001 | 21 | 01100001 | 61 |
| 00100010 | 22 | 01100010 | 62 |
| 00100011 | 23 | 01100011 | 63 |
| 00100100 | 24 | 01100100 | 64 |
| 00100101 | 25 | 01100101 | 65 |
| 00100110 | 26 | 01100110 | 66 |
| 00100111 | 27 | 01100111 | 67 |
| 00101000 | 28 | 01101000 | 68 |
| 00101001 | 29 | 01101001 | 69 |
| 00101010 | 2− | 01101010 | 6− |
| 00101011 | 2+ | 01101011 | 6+ |
| 00110000 | 30 | 01110000 | 70 |
| 00110001 | 31 | 01110001 | 71 |
| 00110010 | 32 | 01110010 | 72 |
| 00110011 | 33 | 01110011 | 73 |
| 00110100 | 34 | 01110100 | 74 |
| 00110101 | 35 | 01110101 | 75 |
| 00110110 | 36 | 01110110 | 76 |
| 00110111 | 37 | 01110111 | 77 |
| 00111000 | 38 | 01111000 | 78 |
| 00111001 | 39 | 01111001 | 79 |
| 00111010 | 3− | 01111010 | 7− |
| 00111011 | 3+ | 01111011 | 7+ |

| Code | Rep. |
|---|---|
| 10000000 | 80 |
| 10000001 | 81 |
| 10000010 | 82 |
| 10000011 | 83 |
| 10000100 | 84 |
| 10000101 | 85 |
| 10000110 | 86 |
| 10000111 | 87 |
| 10001000 | 88 |
| 10001001 | 89 |
| 10001010 | 8− |
| 10001011 | 8+ |
| 10010000 | 90 |
| 10010001 | 91 |
| 10010010 | 92 |
| 10010011 | 93 |
| 10010100 | 94 |
| 10010101 | 95 |
| 10010110 | 96 |
| 10010111 | 97 |
| 10011000 | 98 |
| 10011001 | 99 |
| 10011010 | 9− |
| 10011011 | 9+ |
| 10100000 | −0 |
| 10100001 | −1 |
| 10100010 | −2 |
| 10100011 | −3 |
| 10100100 | −4 |
| 10100101 | −5 |
| 10100110 | −6 |
| 10100111 | −7 |
| 10101000 | −8 |
| 10101001 | −9 |
| 10101010 | −− |
| 10101011 | −+ |
| 10110000 | +0 |
| 10110001 | +1 |
| 10110010 | +2 |
| 10110011 | +3 |
| 10110100 | +4 |
| 10110101 | +5 |
| 10110110 | +6 |
| 10110111 | +7 |
| 10111000 | +8 |
| 10111001 | +9 |
| 10111010 | +− |
| 10111011 | ++ |
| 11000000 | 0 |
| 11000001 | 1 |
| 11000010 | 2 |
| 11000011 | 3 |
| 11000100 | 4 |
| 11000101 | 5 |
| 11000110 | 6 |
| 11000111 | 7 |
| 11001000 | 8 |
| 11001001 | 9 |
| 11001010 | − |

| Code | Rep. |
|---|---|
| 11001011 | + |
| 11001100 | # |
| 11001101 | % |
| 11001110 | @ |
| 11001111 | * |
| 11010000 | . (lower case) |
| 11010001 | A |
| 11010010 | B |
| 11010011 | C |
| 11010100 | D |
| 11010101 | E |
| 11010110 | F |
| 11010111 | G |
| 11011000 | H |
| 11011001 | I |
| 11011010 | comma |
| 11011011 | ? |
| 11011100 | = |
| 11011101 | ¢ |
| 11011110 | ( |
| 11011111 | ) |
| 11100000 | & |
| 11100001 | J |
| 11100010 | K |
| 11100011 | L |
| 11100100 | M |
| 11100101 | N |
| 11100110 | O |
| 11100111 | P |
| 11101000 | Q |
| 11101001 | R |
| 11101010 | tab (Ind.) |
| 11101011 | ½ |
| 11101100 | □ |
| 11101101 | CR (one key-stroke) |
| 11101110 | : |
| 11101111 | . (upper case) |
| 11110000 | / |
| 11110001 | $ |
| 11110010 | S |
| 11110011 | T |
| 11110100 | U |
| 11110101 | V |
| 11110110 | W |
| 11110111 | X |
| 11111000 | Y |
| 11111001 | Z |
| 11111010 | upper case |
| 11111011 | apostrophe |
| 11111100 | end line (Ind.) |
| 11111101 | space (Ind.) |
| 11111110 | pass (No reader go) (Ind.) |
| 11111111 | pass (Ind.) |

Ind.=Independent of Case

In the foregoing code, it will be apparent that the two high-order bits define whether eight bits of code should be interpreted as two four-bit groups or a single six-bit group. Further, when there is to be a two four-bit interpretation, the two high-order bits determine the way the four high-order bits are to be interpreted. Thus, 00 in the high-order bits indicates the code is the number 0 to 3. 01 in the high-order bits indicates the four high-order bits fall in the range of 4 to 7. A 10 in the high-order bits indicates the four high-order bits define an 8, 9, +, or −.

Inasmuch as the circuitry illustrated must be adapted to accommodate the above code, it will be apparent that the circuit must recognize the two high-order bits of each eight-bit combination and control the transfer of information in accordance with whether or not there are two "ones" in this high-order position.

Considering the figure more specifically, the numeral 10 represents an eight-bit input register which is adapted to receive eight-bit code combinations, such as represented in the foregoing table, and make them available, upon call, on the output lines 11 through 18.

The output lines 11 through 18 are adapted to be connected to a series of gating circuits 21 through 28 respectively. In addition, the output lines 15 and 16 are adapted to be connected to a further pair of gates 29 and 30. Each of the gates 21 through 24, 29 and 30 have an additional input derived from a sequencing or timing signal $T_1$. In addition, the gating circuits 25 through 28 are adapted to have a further input derived from a sequencing or timing signal $T_2$. The timing signals $T_1$ and $T_2$ are derived from a flip-flop 35 which is adapted to receive a set signal by way of a line 36 whenever a new eight-bit combination is received in the input register 10. As soon as the flip-flop 35 is set, the timing signal $T_1$ appears.

The timing signal $T_1$ is adapted to produce timing signal $T_2$ by way of a gating circuit 38 having a delay line 39 coupled to the input thereof and a further function $\overline{X}$. The output of the gate 38 will be the timing signal $T_2$. A further gating circuit 40 is provided with an input from the function X and the timing signal $T_1$, with the output of the gating circuit 40 feeding a buffer line 41 which is adapted to supply a reset signal to the flip-flop 35. In addition, the signal from the buffer line 41 is adapted to be applied back by way of line 41A to the input register to signify that the transfer is complete.

In order to produce the function X, there is provided a further gating circuit 42 which has as its input signals from the two output lines 17 and 18 from the input register 10. Whenever there is a signal on both of the input lines, the output function X will be active. In the absence of a signal on both of the input lines on the gating circuit 42, the output function $\overline{X}$ will be present.

In considering the operation of the circuitry illustrated in the figure, it is first assumed that eight bits of data have been transferred into the input register 10. As soon as they are transferred, the input register 10 will supply a signal on the line 36 to the flip-flop 35 to set the flip-flop. At the same time, the signals in the input register will be applied to the output lines 11 through 18. In the event that a code combination is present wherein there are two "ones" in the high-order bit positions, as represented in the above table, the output lines 17 and 18 from the input register 10 will be active and the gate 42 will be opened to produce the output function X. This will mean that the function X will be applied to the gating circuits 29 and 30. With the flip-flop 35 set, the timing signal $T_1$ will also be applied to the gating circuits 21 through 24, 29, and 30. This will open each of these respective gating circuits so that six bits of data will be transferred to an output utilization circuit, such as a translator.

With the output function X active from the gating circuit 42, and with the timing signal $T_1$, the gating circuit 40 will have an output which is applied to the buffer line 41 which will in turn supply reset signals to the flip-flop 35 and a signal to the input register 10 by way of the transfer line 42 to indicate that the transfer relating to the particular eight-bit combination has been completed. It will thus be apparent that in this particular example the two high-order bits in the output lines 17 and 18 are disregarded except to signify that the six low-order bits of the input combination should be interpreted as a single alpha-numeric character.

It is next assumed that the next input combination to the register 10 is an eight-bit combination where the two high-order bits are other than both "ones." As soon as this next eight-bit combination is received, a set signal will be applied by way of a line 36 in the flip-flop 35 and the data will be available on the output lines 11 through 18. Inasmuch as the two high-order bits are other than both "ones," the gating circuit 42 will remain closed so that the output function $\overline{X}$ will be active. Thus at time $T_1$, the gating circuits 21 through 24 will be opened to transfer the four low-order bits from the output lines 11 through 14, to the output utilization circuit or translator.

After a predetermined time delay, as determined by the delay circuit 39, the gating circuit 38 will be opened and the timing signal $T_2$ will be produced. This circuit will activate the gating circuits 25 through 28 so that the four high-order bits on the output lines 15 through 18 may be fed to the output circuit or translator.

After the four high-order bits have been transferred to the output utilization circuit or translator, the timing signal $T_2$ will be effective by way of the buffer line 41 to reset the flip-flop 35 and supply a signal on the line 42 to indicate that a transfer of the input information has been completed.

In the description given above, no mention has been made about using check digits with the data manipulated. Thus, a parity bit or other check bits may be carried along with the data without changing the significance of the above concepts, even though the resultant word length might be increased.

From the foregoing description, it will be apparent that there has been provided an apparatus which is capable of utilizing a multi-bit group of information in one of two ways in accordance with a pair of indicators carried by the information, and that in certain circumstances, the information may include the bit representations which designate whether or not the multi-bit group should be interpreted in one or the other of a pair of bit combinations.

While, in accordance with the provisions of the statutes, there has been illustrated and described the best forms of the invention known, it will be apparent to those skilled in the art that changes may be made in the invention as set forth in the appended claims and that in some cases, certain features of the invention may be used to advantage without a corresponding use of other features.

Having now described the invention, what is claimed as new and novel and for which it is desired to secure by Letters Patent is:

1. Apparatus for manipulating digital data comprising an eight-bit input circuit, a code translator for converting a four- or six-bit code into a selected output signal, a two-bit sensing means connected to said input circuit to sense a selected two of the eight-bit inputs, said sensing means being adapted to be set in a first or a second state, means including said two-bit sensing means when in said first state connecting a first four bits from said input to said code translator and a second four bits to said translator in time sequence, and means including said sensing means when in said second state connecting six bits from said input to said code translator.

2. Apparatus for manipulating digital data comprising an eight-bit input circuit, a code translator for converting a four- or six-bit code into a selected output signal, a sensing means connected to said input circuit to sense two-bit positions of the eight-bit positions on said input, said sensing means being adapted to be in a first or a second state, means including said sensing means when in said first state connecting the eight input bits to said translator to be interpreted as two separate units of output data, and means including said sensing means when in said second state connecting six bits from said input to said code translator to be interpreted as a single unit of output data.

3. Apparatus for manipulating digital data comprising a multi-bit data input circuit, a code translator for converting each selected input bit combination code into a selected output signal, a sensing means connected to said input circuit, said sensing means being adapted to be in a first or a second state in accordance with selected bit combinations on said multi-bit data input, means including said sensing means when in said first state connecting a first combination of bits including said selected bits from said input to said code translator, and means including said sensing means when in said second state connecting the bits from said input other than said selected bits to said code translator.

4. Apparatus for interpreting an eight-bit code which comprises an eight-bit data input means connected to said data input to sense two-bit positions of each eight-bit code appearing thereon, and means including said sensing means selectively connecting two four-bit input combinations or one six-bit input combination from said input to an output in accordance with the two bits sensed by said sensing means.

5. Apparatus for interpreting an eight-bit code which comprises an eight-bit data input, means connected to said input to sense two-bit positions of each eight-bit code appearing thereon, and means including said sensing means selectively connecting eight- or six-bit input combinations to an output in accordance with the two bits sensed by said sensing means.

6. Apparatus for interpreting a multi-bit code which comprises a multi-bit data input, means connected to said input to sense selected bit positions of each multi-bit code appearing thereon, and means including said sensing means selectively connecting all of said multi-bit input code or a selected portion of said multi-bit code to an output in accordance with the bits sensed by said sensing means.

References Cited in the file of this patent

UNITED STATES PATENTS 2,872,666 Greenhalgh ------------- Feb. 3, 1959